United States Patent [19]
Drake et al.

[11] Patent Number: 5,968,343
[45] Date of Patent: Oct. 19, 1999

[54] HYDROCARBON CONVERSION CATALYST COMPOSITION AND PROCESSES THEREFOR AND THEREWITH

[75] Inventors: Charles A. Drake, Nowata; An-hsiang Wu, Bartlesville, both of Okla.

[73] Assignee: Phillips Petroleum Company, Bartlesville, Okla.

[21] Appl. No.: 08/842,465

[22] Filed: May 5, 1997

[51] Int. Cl.$^6$ .............................. C10G 35/06; C10G 1/00
[52] U.S. Cl. ..................... 208/135; 208/114; 208/143; 208/134; 585/222; 585/467; 585/475
[58] Field of Search .................................. 208/135, 114, 208/143; 585/467, 475

[56] References Cited

U.S. PATENT DOCUMENTS

| | | | |
|---|---|---|---|
| 4,117,026 | 9/1978 | Haag et al. | 260/671 R |
| 4,975,402 | 12/1990 | Le Van Mao et al. | 502/64 |
| 5,151,394 | 9/1992 | Chitnis et al. | 502/65 |
| 5,300,215 | 4/1994 | Chitnis et al. | 208/114 |
| 5,516,956 | 5/1996 | Abichandani | 585/475 |

*Primary Examiner*—Helane Myers
*Attorney, Agent, or Firm*—Lucas K. Shay

[57] ABSTRACT

A catalyst composition and a process for converting a hydrocarbon stream such as, for example, gasoline to olefins and $C_6$ to $C_8$ aromatic hydrocarbons such as toluene and xylenes are disclosed. The catalyst composition comprises a zeolite, a binder, and boron wherein the weight of boron is in the range of from about 0.01 to about 10 weight %. The process comprises contacting a hydrocarbon stream with the catalyst composition under a condition sufficient to effect the conversion of a hydrocarbon to an olefin and a $C_6$ to $C_8$ aromatic hydrocarbon. Also disclosed is a process for producing the catalyst composition which comprises: (1) combining a zeolite with a coke-reducing amount of a binder under a condition effective to produce a zeolite-binder mixture; (2) contacting said zeolite-binder mixture with coke-reducing amount of a boron compound under a condition effective to produce a boron-incorporated or -impregnated zeolite; and (3) calcining the boron-incorporated or -impregnated zeolite.

22 Claims, No Drawings

HYDROCARBON CONVERSION CATALYST COMPOSITION AND PROCESSES THEREFOR AND THEREWITH

FIELD OF THE INVENTION

This invention relates to a composition useful for converting a hydrocarbon to a $C_6$ to $C_8$ aromatic hydrocarbon and an olefin, to a process for producing the composition, and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5+$ alkanes; lower alkanes such as methane, ethane, and propane; lower alkenes such as ethylene and propylene; and $C_9+$ aromatic compounds which contain 9 or more carbons per molecule. Recent efforts to convert gasoline to more valuable petrochemical products have therefore focused on improving the conversion of gasoline to olefins and aromatic hydrocarbons by catalytic cracking in the presence of zeolite catalysts. For example, a gallium-promoted zeolite ZSM-5 has been used in the so-called Cyclar Process to convert a hydrocarbon to BTX. The olefins and aromatic hydrocarbons can be useful feedstocks for producing various organic compounds and polymers. However, the weight ratio of olefins to aromatic compounds produced by the conversion process is generally less than 50%. Therefore, development of a catalyst and a process for converting hydrocarbons to the more valuable olefins would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it enhances the ratio of produced olefins to BTX. Other objects and advantages will becomes more apparent as this invention is more fully disclosed hereinbelow.

According to a first embodiment of the present invention, a composition which can be used as a catalyst for converting a hydrocarbon or a hydrocarbon mixture to an olefin and a $C_6$ to $C_8$ aromatic hydrocarbon is provided. The composition comprises a zeolite, a binder, and boron wherein boron is present in the composition in the range of from about 0.01 to about 10 weight percent (%).

According to a second embodiment of the present invention, a process which can be used for producing a catalyst composition is provided. The process comprises the steps: (1) combining a zeolite with a coke-reducing amount of a binder under a condition effective to produce a zeolite-binder mixture; (2) contacting said zeolite-binder mixture with a coke-reducing amount of a boron compound under a condition effective to produce a boron-incorporated or -impregnated zeolite; and (3) calcining the boron-incorporated or -impregnated zeolite.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a hydrocarbon or a hydrocarbon mixture with a catalyst composition which is the same as disclosed above in the first embodiment of the invention under a condition effective to convert a hydrocarbon to an olefin and an aromatic hydrocarbon containing 6 to 8 carbon atoms per molecule wherein the weight ratio of the olefin to aromatic compound is enhanced.

DETAILED DESCRIPTION OF THE INVENTION

The catalyst composition of the first embodiment of the present invention can comprise, consist essentially of, or consist of a zeolite, a binder, and boron. Boron is preferably impregnated or coated on the zeolite or zeolite-binder mixture. According to the present invention the weight of element boron in the invention composition can be in the range of from about 0.01 to about 10, preferably about 0.05 to about 8, and most preferably 0.1 to 5 grams per 100 grams of the composition. The weight of the binder generally can be in the range of from about 1 to about 50, preferably about 5 to about 40, and most preferably 10 to 30 grams per 100 grams of the composition. Zeolite generally makes up the rest of the composition. The composition can also be characterized by having the following physical characteristics: a surface area as determined by the BET method using nitrogen in the range of from about 300 to about 600, preferably 350 to 500 m$^2$/g; a pore volume in the range of from about 0.4 to about 0.8, preferably about 0.5 to about 0.75, and most preferably 0.6 to 0.75 ml/g; an average pore diameter in the range of from about 70 to about 300, preferably about 100 to about 250, and most preferably 125 to 200 Å; and a porosity of more than about 50%.

Any commercially available zeolite can be employed as a starting material of the process of the second embodiment of the invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). The presently preferred zeolites are those having medium pore sizes having the physical characteristics disclosed above. ZSM-5 and similar zeolites that have been identified as having a framework topology identified as MFI are particularly preferred because of their shape selectivity.

Any binders known to one skilled in the art for use with a zeolite are suitable for use herein. Examples of suitable binders include, but are not limited to, clays such as for example, kaolinite, halloysite, vermiculite, chlorite, attapulgite, smectite, montmorillonite, illite, saconite, sepiolite, palygorskite, diatomaceous earth, and combinations of any two or more thereof; aluminas such as for example α-alumina and γ-alumina; silicas; alumina-silica; aluminum phosphate; aluminum chlorohydrate; and combinations of two or more thereof. Because these binders are well known to one skilled in the art, description of which is omitted herein. The presently preferred binder is bentonite because it is readily available.

The composition of the present invention can be prepared by combining a zeolite, a binder, and boron in the weight percent disclosed above under any conditions sufficient to effect the production of such a composition.

However, it is presently preferred that the composition of the present invention be produced by the process disclosed in the second embodiment of the invention. In the first step of the second embodiment of the invention, a zeolite is combined with a binder disclosed above under a condition sufficient to produce a zeolite-binder mixture.

According to the present invention, a zeolite, preferably a ZSM-5 zeolite, and the binder can be well mixed by any means known to one skilled in the art such as stirring, blending, kneading, or extrusion, following which the zeolite-binder mixture can be dried in air at a temperature in the range of from about 20 to about 800° C., for about 0.5 to about 50 hours under any pressures that accommodate the temperatures, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. for about 1 to about 30 hours to prepare a calcined zeolite-binder. Before a binder is combined with a zeolite, the zeolite can also be calcined under similar conditions to remove any contaminants, if present, to prepare a calcined zeolite.

A zeolite, a calcined zeolite, or a calcined zeolite-binder mixture can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange of the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 800, preferably about 0.1 to about 500, more preferably about 1 to about 400, and most preferably 5 to 100 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined hydrogen-form zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchange of exchangeable ions in a zeolite is well known to one skilled in the art. See, for example, U.S. Pat. No. 5,516,956, disclosure of which is incorporated herein by reference. Because the ion exchange procedure is well known, the description of which is omitted herein for the interest of brevity.

In the second embodiment of the invention, a zeolite-binder mixture in a desired ionic form, regardless whether calcined or not, is contacted with a boron compound, under a condition known to those skilled in the art to incorporate a boron compound into a zeolite. Preferably the boron compound is impregnated onto the zeolite or zeolite-binder mixture. Because the methods for incorporating or impregnating a boron compound into a zeolite or zeolite-binder mixture such as, for example, impregnation by incipient wetness method, are well known to those skilled in the art, the description of which is also omitted herein for the interest of brevity.

According to the present invention, any boron-containing compound, which upon being incorporated into, or impregnated or coated onto, a zeolite or zeolite-binder mixture can be converted into a boron oxide upon calcining can be used in the present invention. A boron compound having a formula of $BR_{3-z}W_z$, $(R'BO)_3$, $BW_z$, $B(OR)_3$, or combinations of two or more thereof can be used in the present invention in which R can be hydrogen, an alkyl radical, an alkenyl radical, an aryl radical, an aryl alkyl radical, alkyl arayl radical, and combinations of two or more thereof in which each radical can have 1 to about 20 carbon atoms, R' can be R, RO, RS, $R_2N$, $R_2P$, $R_3Si$, or combinations of two or more thereof, W can be a halogen, $NO_3$, $NO_2$, $SO_4$, $PO_4$, or combinations of two or more thereof, and z is an integer of 1 to 3. Examples of suitable boron compounds include, but are not limited to boric acid, borane-ammonium complex, boron trichloride, boron phosphate, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

Upon the incorporation or impregnation of the boron compound onto the zeolite or zeolite-binder mixture to produce a boron-incorporated or -impregnated zeolite, the boron-incorporated or -impregnated zeolite can be subject to calcination under a condition that can include a temperature in the range of from about 300° C. to about 1000° C., preferably about 350° C. to about 750° C., and most preferably 400° C. to 650° C. under a pressure that accommodates the temperature, generally in the range of from about 1 to about 10 atmospheres (atm), preferably about 1 atm for a period in the range of from about 1 to about 30, preferably about 1 to about 20, and most preferably 1 to 15 hours to produce the composition of the invention.

The composition of the invention then can be, if desired, pretreated with a reducing agent before being used in a hydrodealkylation process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a process useful for converting a hydrocarbon or a hydrocarbon mixture to a mixture rich in olefins and $C_6$ to $C_8$ aromatic hydrocarbons comprises, consists essentially of, or consists of contacting a fluid stream comprising a hydrocarbon or hydrocarbon mixture which can comprise paraffins, olefins, naphthenes, and aromatic compounds with a catalyst composition under a condition sufficient to effect the conversion of a hydrocarbon mixture to a mixture rich in olefins and $C_6$ to $C_8$ aromatic hydrocarbons or to enhance the weight ratio of olefins (ethylene and propylene) to the $C_6$ to C8 aromatic compounds. The catalyst composition is the same as that disclosed in the first embodiment of the invention. The term "fluid" is used herein to denote gas, liquid, vapor, or combinations thereof. The term "hydrocarbon" is generally referred to, unless otherwise indicated, as one or more hydrocarbons having from about 4 carbon atoms to about 30 carbon atoms, preferably about 5 to about 20 carbon atoms, and most preferably 5 to 16 carbon atoms per molecule. The term "enhanced" refers to an increased weight ratio of olefins to BTX employing the catalyst composition as compared to employing a zeolite such as commercially available ZSM-5 and generally the weight ratio is greater than 1:1, preferably 2:1. Examples of a hydrocarbon include, but are not limited to butane, isobutanes, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

Any fluid which contains a hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins and aromatic compounds (if present).

The contacting of a fluid feed stream containing a hydrocarbon with the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include an hourly space velocity of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to C8 aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of catalyst composition of the invention.

A zeolite ZSM-5 obtained from CU Chemie Uetikon AG, Uetikon, Switzerland having a product designate of Zeocat PZ 2/50H (obtained as powder) was used in the preparation of the catalyst composition of the invention. Twenty g of the zeolite was well mixed with 5 g of bentonite in a beaker followed by adding just enough water to make a paste. The paste was then extruded at room temperature (25° C.) to further thoroughly mix the zeolite-bentonite mixture. Thereafter, the zeolite-bentonite extrudate was dried at 125° C. in an oven. The dried zeolite-bentonite extrudate was then subject to calcining at 500° C. for 3 hours to produced a calcined zeolite-bentonite extrudate (control catalyst).

In a separate run, 40 g of the Zeocat zeolite was mixed with 10 g of bentonite to produce a second calcined zeolite-bentonite mixture. Thereafter, a solution containing 5 g of boric acid in 100 ml of water was prepared. A portion (9 g) of the solution was added to 10 g of the second calcined zeolite-bentonite mixture to impregnated the second calcined zeolite-bentonite mixture with boric acid to produce a boric acid-impregnated zeolite-bentonite. Following addition of just enough water to thoroughly wet the boric acid-impregnated zeolite-bentonite to form a paste, the paste was dried and calcined as described above to produce a boron-promoted (impregnated) zeolite (invention catalyst) which contained 0.775 weight % boron by calculation.

In a comparative run, a comparative catalyst was produced by the procedure described above for producing the control catalyst except that 5 g of boric acid was also added, contemporaneously with the addition of bentonite, to the zeolite powder. The resulting comparative catalyst contained 3.219 weight % boron by calculation.

EXAMPLE II

This example illustrates the use of the catalyst compositions described in Example I as catalysts in the conversion of hydrocarbons to olefins and BTX.

A quartz reactor tube (inner diameter 1 centimeter; length 60 centimeter) was filled with a 20 centimeter bottom layer of Alundum® alumina (inert, low surface area alumina), 5 grams of one of the catalysts in the middle 20 centimeter of the tube, and a 20 centimeter top layer of Alundum® alumina. The liquid feed was a gasoline obtained from Phillips Petroleum Company, Bartlesville, Okla. and contained hydrocarbons shown in Table I. The liquid feed shown in Table I is summarized as: 38.7 weight percent (%) lights ($C_5$s and $C_6$s); 1.3% benzene; 5.4% toluene; 8.1% $C_8$ aromatics; 38.9% nonaromatics in BTX boiling range; and 25.9% heavies ($C_8$+). The feed was introduced into the reactor at a rate of 14 ml/hour (10.44 g/hour). The reaction temperature was 600° C. The reactor effluent was cooled and separated into a gaseous phase and a liquid phase. Both phases were analyzed by gas chromatographs at intervals of about 1 hour. About 2 hours after the feed was started, reactor effluent was again sampled and analyzed by gas chromatography for olefins and BTX content. The results of the runs at about 6 hours were shown in Table II below which illustrates the production of olefins and BTX from the Table I feed and individual catalyst compositions produced in Example I.

TABLE I

Hydrocarbon Analysis of Catalytically Cracked Gasoline

| | n-paraffins | Iso-paraffins | Aromatics | Naphthenes | Olefins | Total |
|---|---|---|---|---|---|---|
| C1 | 0.000 | 0.000 | 0.000 | 0.000 | 0.000 | 0.000 |
| C2 | 0.000 | 0.000 | 0.000 | 0.000 | 0.000 | 0.000 |
| C3 | 0.000 | 0.000 | 0.000 | 0.000 | 0.000 | 0.000 |
| C4 | 0.000 | 0.000 | 0.000 | 0.000 | 0.018 | 0.018 |
| C5 | 1.292 | 8.147 | 0.000 | 0.169 | 10.741 | 20.348 |
| C6 | 0.749 | 7.164 | 1.266 | 1.972 | 7.135 | 18.287 |
| C7 | 0.740 | 4.576 | 5.354 | 2.746 | 6.483 | 19.899 |

TABLE I-continued

Hydrocarbon Analysis of Catalytically Cracked Gasoline

| | n-paraffins | Iso-paraffins | Aromatics | Naphthenes | Olefins | Total |
|---|---|---|---|---|---|---|
| C8 | 0.760 | 3.234 | 8.120 | 2.531 | 0.830 | 15.475 |
| C9 | 0.187 | 2.070 | 8.187 | 0.708 | 0.125 | 11.278 |
| C10 | 0.163 | 1.193 | 5.155 | 0.072 | 0.048 | 6.631 |
| C11 | 0.153 | 0.307 | 3.606 | 0.191 | 0.000 | 4.257 |
| C12 | 0.115 | 0.974 | 0.768 | 0.088 | 0.000 | 1.946 |
| C13 | 0.048 | 0.000 | 0.000 | 0.000 | 0.000 | 0.048 |
| C14 | 0.000 | 0.000 | 0.000 | 0.000 | 0.000 | 0.000 |
| Total | 4.208 | 27.664 | 32.457 | 8.478 | 23.381 | 98.188 |
| | | | | | Total $C_{15}$+ | 0.108 |
| | | | | | Total Unknowns: | 1.704 |

TABLE II[a]

Olefins and BTX Production (weight percent in product)

| | Control Catalyst | Comparative Catalyst | Invention Catalyst |
|---|---|---|---|
| Ethylene | 7.8 | 2.5 | 8.8 |
| Propylene | 6.8 | 2.1 | 13.2 |
| BTX | 42.0 | 2.5 | 30.0 |
| Coke[a] | 1.2 | ND[b] | 0.7 |

[a]Coke was determined at the end of the reaction by removing the catalysts from the reactor and determined with a thermal gravimetric analyzer (TGA), manufactured by TA Instruments, New Castle, Delaware.
[b]ND, not determined.

The results presented in Table II demonstrate that untreated zeolite (control) produced significantly more BTX than olefins. The invention catalyst significantly increased the ratio of produced olefins to BTX, i.e., increased the production of olefins. However, with the comparative catalyst composition which was produced by contemporaneously mixing boric acid, bentonite, and ZSM-5 zeolite, the yields of olefins and BTX were surprisingly low.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a fluid which comprises a hydrocarbon with a catalyst composition under a condition sufficient to effect the conversion of a hydrocarbon to an olefin and a $C_6$ to $C_8$ aromatic hydrocarbon wherein said catalyst composition is produced by the steps comprising: (1) combining a ZSM-5 zeolite with a binder under a condition effective to produce a zeolite-binder mixture; (2) contacting said zeolite-binder mixture with a coke-reducing amount of a boron compound under a condition effective to produce a boron-incorporated or -impregnated zeolite; and (3) calcining the boron-incorporated or -impregnated zeolite; and said boron compound is selected from the group consisting of boric acid, borane-ammonium complex, boron trichloride, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

2. A process according to claim 1 wherein said fluid comprises gasolines from catalytic oil cracking processes, pyrolysis gasolines from thermal cracking of saturated hydrocarbons, naphthas, gas oils, reformates, and combinations of two or more thereof.

3. A process according to claim 1 wherein said hydrocarbon contains about 4 to about 30 carbon atoms.

4. A process according to claim 1 wherein said hydrocarbon contains 5 to 16 carbon atoms.

5. A process according to claim 1 wherein said hydrocarbon is selected from the group consisting of butane, isobutanes, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

6. A process according to claim 1 wherein said hydrocarbon is a gasoline.

7. A process according to claim 1 wherein the weight of boron is present in said catalyst composition in the range of from about 0.01 to about 10 weight %.

8. A process according to claim 1 wherein the weight of boron is present in said catalyst composition in the range of from 0.1 to 5 weight %.

9. A process according to claim 1 wherein said condition comprises a weight hourly space velocity of said fluid in the range of about 0.01 g/g catalyst/hour to about 100 g/g catalyst/hour, a pressure in the range of about 0 psig to about 200 psig, and a temperature in the range of about 250° C. to about 1,000° C.

10. A process according to claim 1 wherein said zeolite-binder mixture produced in step (1) is calcined prior to being contacted with said boron compound.

11. A process according to claim 10 wherein said binder is selected from the group consisting of kaolinite, halloysite, vermiculite, chlorite, attapulgite, smectite, montmorillonite, illite, saconite, sepiolite, palygorskite, diatomaceous earth, $\alpha$-alumina and $\gamma$-alumina; silicas; alumina-silica; aluminum phosphate; aluminum chlorohydrate; and combinations of two or more thereof.

12. A process according to claim 10 wherein said binder is bentonite.

13. A process according to claim 10 wherein said boron compound has the formula selected from the group consisting of $BR_{3-z}W_z$, $(R'BO)_3$, $BW_z$, $B(OR)_3$, and combinations of two or more thereof wherein R is selected from the group consisting of hydrogen, alkyl radicals, alkenyl radicals, aryl radicals, aryl alkyl radicals, alkyl radicals, alkyl arayl radicals, and combinations of two or more thereof, R' is selected from the group consisting of R, RO, RS, $R_2N$, $R_2P$, $R_3Si$, and combinations of two or more thereof, W is selected from the group consisting of halogen, $NO_3$, $NO_2$, $SO_4$, and combinations of two or more thereof, and z is an integer of 1 to 3.

14. A process according to claim 12 wherein said boron compound is boric acid.

15. A process according to claim 10 wherein said boron compound is boric acid.

16. A process according to claim 1 wherein
said fluid comprises gasolines from catalytic oil cracking processes, pyrolysis gasolines, naphthas, gas oils, reformates, and combinations of two or more thereof;
said hydrocarbon contains about 4 to about 30 carbon atoms;
said condition comprises a weight hourly space velocity of said fluid in the range of about 0.01 g/g catalyst/hour to about 100 g/g catalyst/hour, a pressure in the range of about 0 psig to about 200 psig, and a temperature in the range of about 250° C. to about 1,000° C.; said binder is selected from the group consisting of kaolinite, halloysite, vermiculite, chlorite, attapulgite, smectite, montmorillonite, illite, saconite, sepiolite, palygorskite, diatomaceous earth, $\alpha$-alumina and $\gamma$-alumina; silicas; alumina-silica; aluminum phosphate; aluminum chlorohydrate; and combinations of two or more thereof and said boron compound is selected from the group consisting of boric acid, borane-ammonium complex, boron trichloride, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

17. A process according to claim 16 wherein said hydrocarbon is gasoline; said binder is bentonite; and said boron compound is boric acid.

18. A process for enhancing the weight ratio of olefin to $C_6$–$C_8$ aromatic hydrocarbon in product stream comprising contacting gasoline with a catalyst composition under a condition sufficient to effect the conversion of said gasoline to an olefin and a $C_6$ to $C_8$ aromatic hydrocarbon wherein said composition is prepared by the steps comprising: (1) contacting a ZSM-5 zeolite with a binder to produce a zeolite-binder mixture; (2) calcining said zeolite-binder mixture to produce a calcined zeolite-binder mixture; (3) contacting said calcined zeolite-binder mixture with an aqueous solution of a boron compound under a condition sufficient to produce a boron compound-impregnated zeolite; (4) calcining said boron compound impregnated zeolite; wherein
said hydrocarbon contains about 4 to about 30 carbon atoms;
said condition comprises a weight hourly space velocity of said fluid in the range of about 0.01 g/g catalyst/hour to about 100 g/g catalyst/hour, a pressure in the range of about 0 psig to about 200 psig, and a temperature in the range of about 250° C. to about 1,000° C.; said binder is selected from the group consisting of kaolinite, halloysite, vermiculite, chlorite, attapulgite, smectite, montmorillonite, illite, saconite, sepiolite, palygorskite, diatomaceous earth, $\alpha$-alumina and $\gamma$-alumina; silicas; alumina-silica; aluminum phosphate; aluminum chlorohydrate; and combinations of two or more thereof and said boron compound is selected from the group consisting of boric acid, borane-ammonium complex, boron trichloride, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

19. A process according to claim 18 wherein said binder is bentonite and said boron compound is boric acid.

20. A process comprising (1) combining a ZSM-5 zeolite with a binder to produce a zeolite-binder mixture; (2) calcining said zeolite-binder mixture to produce a calcined zeolite-binder; (3) contacting said calcined zeolite-binder with an aqueous solution of a boron compound under a condition sufficient to produce a boron compound-impregnated zeolite; and (4) calcining said boron compound impregnated zeolite; and said boron compound is selected from the group consisting of boric acid, borane-ammonium complex, boron trichloride, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

21. A process according to claim 20 wherein said binder is selected from the group consisting of kaolinite, halloysite, vermiculite, chlorite, attapulgite, smectite, montmorillonite, illite, saconite, sepiolite, palygorskite, diatomaceous earth, α-alumina and γ-alumina; silicas; alumina-silica; aluminum phosphate; aluminum chlorohydrate; and combinations of two or more thereof and said boron compound is selected from the group consisting of boric acid, borane-ammonium complex, boron trichloride, boron nitride, triethyl borane, trimethyl borane, tripropyl borane, trimethyl borate, triethyl borate, tripropyl borate, trimethyl boroxine, triethyl boroxine, tripropyl boroxine, and combinations of two or more thereof.

22. A process according to claim 20 wherein said binder is bentonite and said boron compound is boric acid.

* * * * *